M. Ellis,
Rake.
No. 107,018.  Patented Sep. 6, 1870.

Witnesses:
W. A. Wilber
Samuel O. Lamb

Minot Ellis
Inventor:

United States Patent Office.

MINOT ELLIS, OF GREENFIELD, MASSACHUSETTS.

Letters Patent No. 107,018, dated September 6, 1870.

IMPROVEMENT IN HAND-RAKE.

The Schedule referred to in these Letters Patent and making part of the same

I, MINOT ELLIS, of Greenfield, in the county of Franklin and State of Massachusetts, have invented new and useful Improvements in Hand-Rakes; and I do hereby declare that the following is a full and complete description of the same, reference being had to the accompanying drawing and to the letters of reference thereon.

My invention relates to the construction of a hand-rake, having the ordinary wooden handle and bows, with a round or cylindrical head, which is furnished with a spline or rib, either of metal or wood, upon the under side, and running the whole length of the head, and having elastic teeth of brass or other wire, so constructed and attached as to possess elastic properties, the lower ends of the teeth being turned up and soldered to give them an easy movement over the ground.

Figure 1, in the accompanying drawing, represents the rake complete and in perspective, except the tail end of the handle, which is not shown.

A is the handle.

B B represent the bows.

C represents the head.

D represents the spline or rib upon the under side of the head.

E represents the teeth.

Like letters refer to like parts in the several figures.

The handle, bows, and head, are preferably made of wood, but the head may be made of tubular metal.

Figure 1:
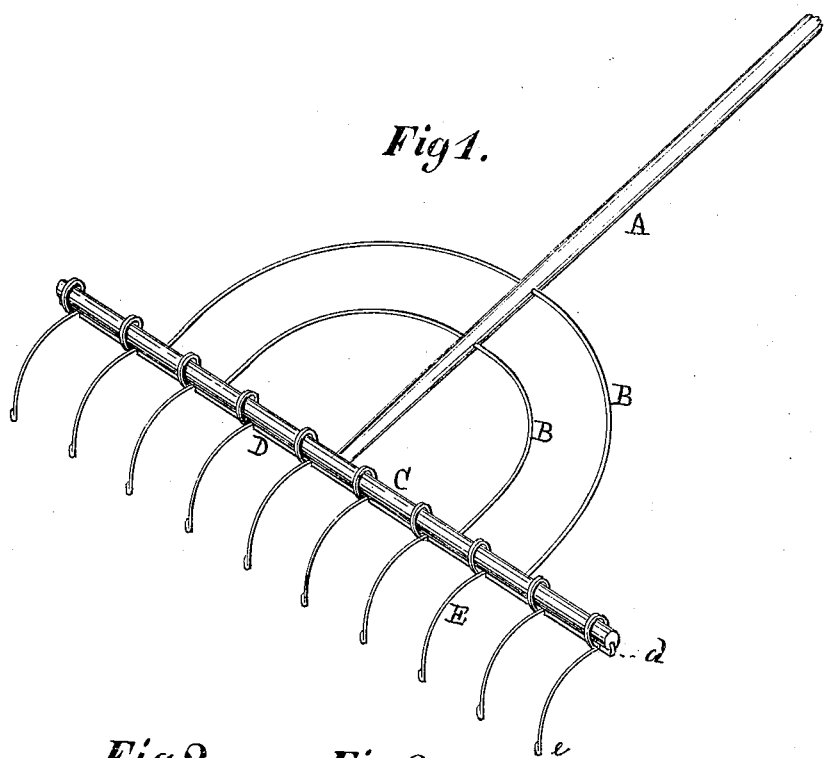

The spline is preferably made of metal, and set into the head, as shown at $d$, fig. 1, but it may be formed of one and the same piece with the head.

Figure 2:
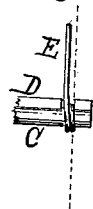
Figure 2 shows the end of the head inverted, with one tooth.

The spline D is notched, as shown in fig. 2, for the purpose of preventing a lateral movement of the teeth.

The wire for the teeth is preferably of hard brass wire, from a tenth to an eighth of an inch in diameter, according to the size of the rake.

Figure 3:
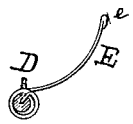
Figure 3 shows a cross-section of the head, with the manner of inserting the tooth, which figure is also inverted.

The teeth are cut to a uniform length, and one end bent over upon itself and soldered, as shown at $e$, in figs. 1 and 3. The other end of the wire is then inserted into the head and bent around the same at least two turns.

The body of the tooth is curved, as shown in figs. 1 and 3; and they may be curved more or less, as desired.

What I claim as my invention, and desire to secure by Letters Patent, is—

The herein described hand-rake, as a new article of manufacture.

MINOT ELLIS.

Witnesses:
W. A. WILBER,
SAMUEL O. LAMB.